United States Patent
Rao et al.

(10) Patent No.: US 12,200,274 B2
(45) Date of Patent: *Jan. 14, 2025

(54) AUTOMATED OPTIMIZATION OF VIDEO SETTINGS IN A DIGITAL VIDEO PRODUCTION SYSTEM HAVING MULTIPLE VIDEO CAPTURE DEVICES

(71) Applicant: DISH Network Technologies India Private Limited, Karnataka (IN)

(72) Inventors: Narayana Rao, Bangaluru (IN); Laxminarayana Dalimba, Bangaluru (IN); Satish Iyer, Bangaluru (IN); Vikram Balarajashetty, Bangaluru (IN)

(73) Assignee: DISH Network Technologies India Private Limited (IN)

( * ) Notice: Subject to any disclaimer, the term of this patent is extended or adjusted under 35 U.S.C. 154(b) by 0 days.

This patent is subject to a terminal disclaimer.

(21) Appl. No.: 18/337,363

(22) Filed: Jun. 19, 2023

(65) Prior Publication Data

US 2023/0336790 A1 Oct. 19, 2023

Related U.S. Application Data

(63) Continuation of application No. 17/126,817, filed on Dec. 18, 2020, now Pat. No. 11,722,706.

(30) Foreign Application Priority Data

Dec. 23, 2019 (IN) .............................. 201941053357

(51) Int. Cl.
*H04N 21/2187* (2011.01)
*H04N 21/218* (2011.01)
(Continued)

(52) U.S. Cl.
CPC ... *H04N 21/2187* (2013.01); *H04N 21/21805* (2013.01); *H04N 21/2343* (2013.01); *H04N 21/4223* (2013.01)

(58) Field of Classification Search
CPC ......... H04N 21/2187; H04N 21/21805; H04N 21/2343; H04N 21/4223; H04N 21/2408;
(Continued)

(56) References Cited

U.S. PATENT DOCUMENTS 10,129,569 B2 * 11/2018 Ortiz ................ H04N 21/47815
2012/0218416 A1 * 8/2012 Leny ..................... H04N 7/181
348/E7.085

(Continued)

*Primary Examiner* — Alazar Tilahun
(74) *Attorney, Agent, or Firm* — KW Law, LLP

(57) ABSTRACT

An automated process for multi-feed video systems comprises receiving a plurality of video feeds from a plurality of video-capture devices. The video feeds each have a quality parameter set to an initial value. A priority feed is selected from the video feeds. A quality parameter of the priority feed is set to a priority value in response to selecting the priority feed. The video-capture devices are instructed to format the video feeds based on the quality parameter of each video feed. The quality parameter for each video feed comprises a bitrate or a resolution for the video feed. The priority feed is streamed as a video output. The video feeds are displayed for selection in an interface, and the interface comprises a map including a location of the video-capture devices.

20 Claims, 2 Drawing Sheets

(51) Int. Cl.
*H04N 21/2343* (2011.01)
*H04N 21/4223* (2011.01)

(58) Field of Classification Search
CPC ....... H04N 21/440263; H04N 21/6181; H04N 21/6543
See application file for complete search history.

(56) References Cited

U.S. PATENT DOCUMENTS

| | | | |
|---|---|---|---|
| 2014/0320662 A1* | 10/2014 | McNamee | H04N 23/63 348/159 |
| 2017/0214970 A1* | 7/2017 | Hauenstein | H04N 19/59 |
| 2018/0220166 A1* | 8/2018 | Meyer | H04N 21/234363 |

* cited by examiner

AUTOMATED OPTIMIZATION OF VIDEO SETTINGS IN A DIGITAL VIDEO PRODUCTION SYSTEM HAVING MULTIPLE VIDEO CAPTURE DEVICES

CROSS-REFERENCE TO RELATED APPLICATIONS

This application claims the benefit of India provisional patent application number 201941053357, filed Dec. 23, 2019. This application also claims priority to U.S. patent application Ser. No. 17/126,817 filed on Dec. 18, 2020 and entitled "AUTOMATED OPTIMIZATION OF VIDEO SETTINGS IN A DIGITAL VIDEO PRODUCTION SYSTEM HAVING MULTIPLE VIDEO CAPTURE DEVICES." The foregoing applications are both incorporated herein by reference for any purpose.

TECHNICAL FIELD

Embodiments of the subject matter described herein relate generally to the production of digital video content. More particularly, embodiments of the subject matter relate to a system and related operating methodologies that automatically optimize or prioritize wireless video connections for video feeds to be used for video processing, streaming, and/or programming.

BACKGROUND

Recent years have seen an explosion in the creation and enjoyment of digital video content. Millions of people around the world now carry mobile phones, cameras, or other devices that are capable of capturing high quality video and/or of playing back video streams in a convenient manner. Moreover, Internet sites such as YOUTUBE have provided convenient and economical sharing of live-captured video, thereby leading to an even greater demand for live video content.

More recently, video production systems have been created that allow groups of relatively non-professional users to capture one or more video feeds, to select one of the video feeds for an output stream, and to thereby produce a professional-style video of the output stream for viewing, sharing, publication, archiving and/or other purposes. Many of these systems rely upon Wi-Fi, Bluetooth, and/or other wireless communications for sharing of video feeds, control instructions and the like. A "producer" can operate a controller device that displays each of the available video feeds to select which video feed is to be displayed or processed at any given time. If all of the video capture devices are co-located and operated to capture the same event, then the producer can monitor the video feeds and manually select one of them as the currently focused feed.

In a practical deployment, however, wireless resources, the quality and integrity of wireless links used to transfer video data, and the number of wireless connections maintained by the video production system can vary in a dynamic and ongoing manner. Accordingly, it is desirable to have an automatic monitoring and optimizing methodology that adjusts certain parameters and characteristics of the video feeds supported by the video production system, such that available wireless resources can be effectively and efficiently utilized. Furthermore, other desirable features and characteristics will become apparent from the subsequent detailed description and the appended claims, taken in conjunction with the accompanying drawings and the foregoing technical field and background.

BRIEF SUMMARY

Disclosed here is an automated method of operating a video production device that produces a video production stream of an event from a plurality of video input streams that are captured by a plurality of different video capture devices. An implementation of the method involves: receiving the plurality of video input streams from the plurality of different video capture devices; selecting one of the plurality of video input streams as a current video output stream; in response to the selecting, determining a prioritization scheme for the plurality of video input streams; generating video format instructions for each of the plurality of different video capture devices, in accordance with the determined prioritization scheme; and sending the video format instructions from the video production device to the plurality of different video capture devices. The video format instructions are configurable to be executed by the plurality of video capture devices to confirm or adjust at least one video quality setting of the plurality of video input streams, such that the current video output stream is of higher quality relative to unselected video input streams of the plurality of video input streams.

Also disclosed is a video production device for producing a video production stream of an event occurring within an environment that includes a plurality of different video capture devices capturing respective video input streams of the event. An embodiment of the video production device includes: a processor hardware device; and a memory storage device to store processor-executable instructions that are configurable to be executed by the processor hardware. When executed, the processor performs a method that includes the steps of: receiving a plurality of video input streams from the plurality of different video capture devices; selecting one of the plurality of video input streams as a current video output stream; in response to the selecting, determining a prioritization scheme for the plurality of video input streams; generating video format instructions for each of the plurality of different video capture devices, in accordance with the determined prioritization scheme; and sending the video format instructions from the video production device to the plurality of different video capture devices. The video format instructions are configurable to be executed by the plurality of video capture devices to confirm or adjust at least one video quality setting of the plurality of video input streams, such that the current video output stream is of higher quality relative to unselected video input streams of the plurality of video input streams.

A video production system is also disclosed here. The system includes: a plurality of video capture devices; and a video production device to wirelessly communicate with the plurality of video capture devices within a wireless network established by the video production device. The video production device includes a processor hardware device and a memory storage device to store processor-executable instructions that are configurable to be executed by the processor hardware device to perform a method having the steps of: receiving a plurality of video input streams from the plurality of different video capture devices; selecting one of the plurality of video input streams as a current video output stream; in response to the selecting, determining a prioritization scheme for the plurality of video input streams; generating video format instructions for each of the plurality of different video capture devices, in accordance with the determined prioritization scheme; and sending the video format instructions from the video production device to the plurality of different video capture devices. The video format instructions are configurable to be executed by the plurality of video capture devices to confirm or adjust at least one video quality setting of the plurality of video input streams, such that the current video output stream is of higher quality relative to unselected video input streams of the plurality of video input streams.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
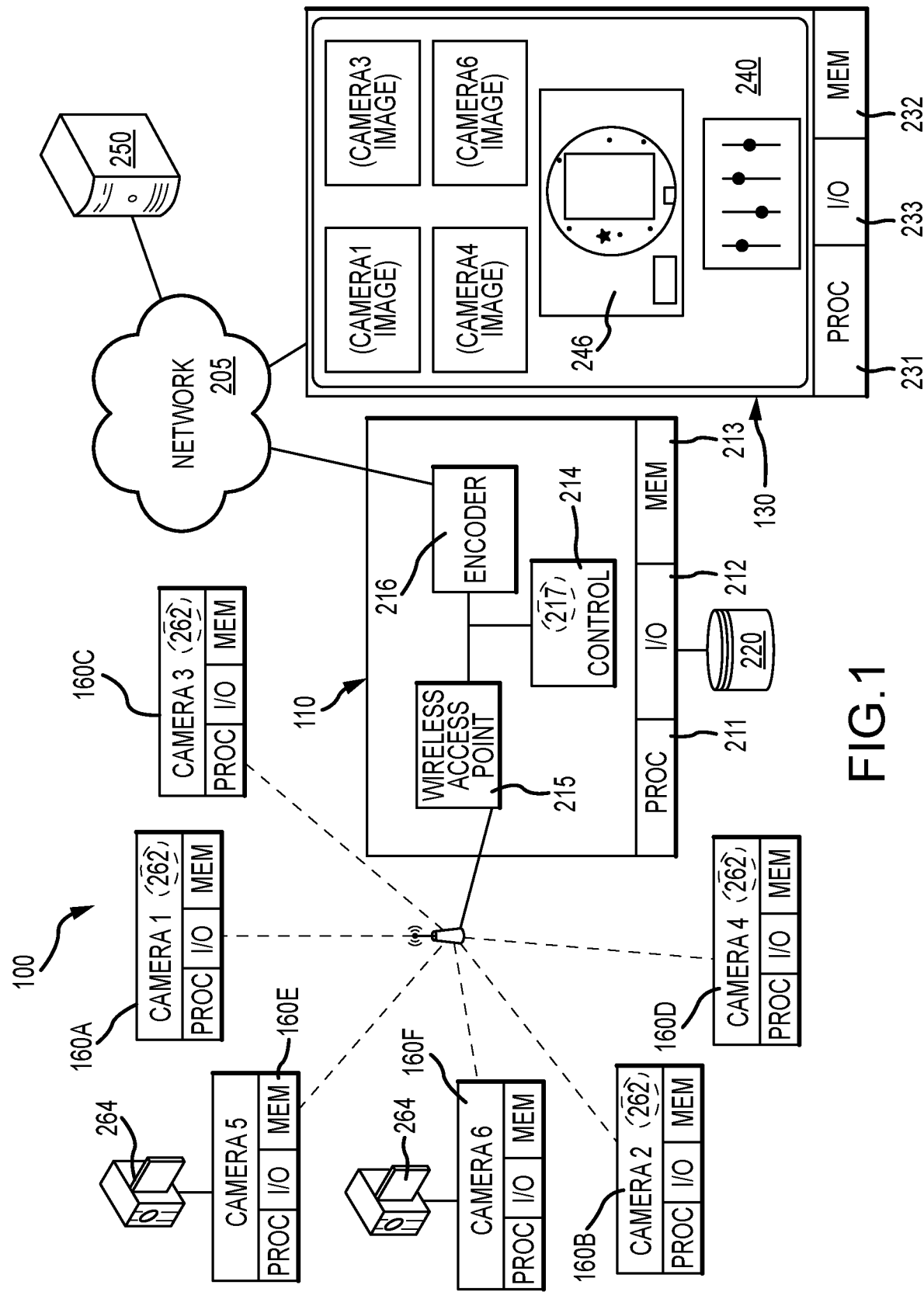
FIG. 1 is a schematic block diagram representation of a digital video production system that is arranged and configured in accordance with an exemplary embodiment of the invention.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. In certain embodiments, the program or code segments are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

Various embodiments improve operation of a digital video production system by automatically adjusting characteristics, settings, and/or formatting of a plurality of different video feeds, wherein one of the video feeds is selected for production, editing, live streaming, or the like. The methodology described herein is particularly suitable for use in a system having multiple video capture devices operating concurrently to capture video of the same ongoing event of interest. For example, the digital video production system can be deployed in a setting such as a wedding, a concert, or a sporting event where a plurality of client devices (the video capture devices) are operated by different members of the audience. The video feed that is selected as the "program" feed is prioritized to ensure that it is stable and high quality, relative to the unselected feeds. The prioritization and optimization scheme is particularly suitable for use in a local environment having limited wireless resources to allocate among the different video capture devices. To this end, the system can automatically adjust certain characteristics, parameters, or settings of the video capture devices in a dynamic, on-demand manner. In accordance with the exemplary embodiments described herein, the video capture devices can be monitored and controlled to: (1) adjust the bitrates of the video streams; (2) adjust the video resolutions of the video streams; or (3) adjust the bitrates and video resolutions of the video streams. In practice, these aspects may be modified and/or enhanced as desired across a wide array of alternate but equivalent embodiments.

The general concepts described herein may be implemented in any video production context, especially the capture and encoding or transcoding of live video. For convenience of illustration, the following discussion often refers to a video production system in which one or more live video streams are received from one or more cameras or other capture devices via a wireless network to produce an output video stream for publication, live streaming, or other sharing. Equivalent embodiments could be implemented within other contexts, settings or applications as desired.

Turning now to the drawings and with initial reference to FIG. 1, an exemplary embodiment of a digital video production system 100 includes, without limitation: a video production device 110; a plurality of video capture devices 160; a control device 130; and a hosting or distribution server system 250. The video production device 110, the video capture devices 160, and the control device 130 are all located within network communication range of each other. That said, it is not necessary that the control device 130 be located within the same environment as the video production device 110 and the video capture devices 160, because Internet or other communication methodologies may allow the control device 130 to communicate with the video production device 110 from other locations, as desired.

The video production system 100 can be used to produce a video program based upon selected inputs from multiple input video feeds. In the illustrated example, the video production device 110 includes a wireless access point 215 and an encoder 216 with appropriate encoding hardware to encode video programming based upon instructions received from the control device 130. The encoded video program may be initially stored as a file on an external storage device 220 (e.g., a memory card, hard drive, or other non-volatile storage) for eventual uploading to the hosting or distribution server system 250 operating on the Internet or another network 205. The hosting or distribution server system is suitably configured and operated to support or provide various services, such as YOUTUBE, FACEBOOK, USTREAM, TWITCH, MIXER, etc. Although the illustrated embodiment of the video production device 110 includes wireless access point and encoder functionality, equivalent embodiments could split the encoding and access point functions and employ more than one hardware device (instead of a single video production device 110).

The video production device 110 can be a processor or computer based component that includes processing hardware such as a microprocessor 211, memory 213, and input/output interfaces 212 (including a suitable USB or other interface to the external storage device 220). The example illustrated in FIG. 1 shows the video production device 110 including processing logic to implement an IEEE 802.11, 802.14 or other wireless access point 215 for communicating with any number of video capture devices 160, which could include any number of mobile phones, tablets, or similar devices executing a video capture application 262, as desired. The video capture devices 160 could also include one or more conventional video cameras 264 that interact with the video production device via an interface device that receives DVI, HDMI, or other video inputs and transmits the received video to the video production device 110 via a Wi-Fi, Bluetooth, or other wireless network, as appropriate. Other embodiments could facilitate communications with any other types of video capture devices in any other manner.

The video production device 110 is also shown to include a controller 214 and an encoder 216, as appropriate. The controller 214 and/or the encoder 216 may be implemented as software logic stored in memory 213 and executing on processor 211 in some embodiments. The controller 214 may be implemented as a control application executing on the processor 211, for example, that includes logic 217 for implementing the various functions, features, and operations described here. Other embodiments may implement the various functions and features using hardware, software, and/or firmware logic executing on other components, as desired. The encoder 216, for example, may be implemented using a dedicated video encoder chip in some embodiments.

In various embodiments, the video production device 110 operates in response to user inputs supplied by the control device 130. The control device 130 is any sort of computing device that includes conventional processor 231, memory 232, and input/output 233 features. Various embodiments could implement the control device 130 as a tablet, laptop, or other computer system, for example, or as a mobile phone or other computing device that executes a software control application 240 for controlling the functions of the video production device 110. Typically, the control device 130 interacts with the video production device 110 via a wireless network 205, although wired connections could be equivalently used. Although FIG. 1 shows the network 205 as being separate from the wireless connections between the video production device 110 and the video capture devices 160, in practice the same Wi-Fi or other networks could be used if sufficient bandwidth is available. Other embodiments may use any other network configuration desired, including any number of additional or alternate networks or other data links.

The example illustrated in FIG. 1 shows the control application 240 having an interface that shows various video feeds received from some or all of the video capture devices 160, and that lets the user select an appropriate feed (referred to herein as the "program" feed or the "production" feed) to encode into the finished product. The control application 240 may include other displays to control other behaviors or features of the system 100, as desired. In the illustrated example, a graphical user interface 246 illustrating the operating environment or layout of the video capture devices 160 is shown at the same time as the captured imagery, albeit in a separate portion of the display. In practice, however, the interface 246 may equivalently be presented on a separate screen or image than the captured content for larger presentation or ease of viewing. The interface 246 could be equivalently presented in a dashboard or similar view that presents system or device status information, as desired. Again, the presentation and appearance of the interface 246 may be very different in other embodiments, and may incorporate any different types of information or content arranged in any manner.

In operation, then, a user acting as a video producer would use the control application 240 running on the control device 130 to view the various video feeds that are available from one or more video capture devices 160. The video production device 110 receives the corresponding video feed from the selected capture device. The video production device 110 compresses or otherwise encodes the selected video data in an appropriate format for eventual viewing or distribution, e.g., via an Internet or other service provided by the hosting or distribution server system 250.

In various embodiments, the user interface 246 includes a graphical representation of a map or other physical layout of the operating environment. Additional information presented in the user interface 246 may be visually overlaid upon a map, drawing, camera image or other graphic if desired, if such graphics are available. In other embodiments, the control application 240 or the like could provide a graphical interface that allows the producer/user to draw an image of the physical environment, as desired. If the video production is intended to show a basketball game, for example, it may be desirable to draw the court floor, sidelines, baskets, etc. for later reference. If graphical imagery is not available, however, the relative locations of the different entities operating within the system may still be useful.

Location information is transmitted to the video production device 110 on any regular or irregular temporal basis, and the user interface 246 is updated as desired so that the producer user can view the locations of the various video capture devices 160. Location information can be useful in knowing which camera angles or shots are available so that different cameras can be selected for preview imagery and/or for the output stream. If a video production application is only capable of displaying four potential video feeds, for example, but more than four cameras are currently active in the system, then the locations of the various cameras may be helpful in selecting those cameras most likely to have content feeds that are of interest. Location information can also be useful in determining communication signal strength. Other embodiments may make use of additional benefits derived from knowing and/or presenting the locations of devices operating within the system, as more fully described herein.

As shown in FIG. 1, the video production system 100 can be deployed in an environment such that the wireless access point 215 of the video production device 110 is associated with a wireless network that includes all of the video capture devices 160. In practice, the video capture devices 160 can communicate with the video production device 110 on the same wireless channel via corresponding wireless data communication links. Depending on various factors, the quality of the wireless network and/or the quality of the individual wireless links may dynamically change in an ongoing manner. As a preliminary matter, the nature of a typical Wi-Fi data communication paradigm and various attributes of an exemplary wireless access point will first be discussed in some detail.

In certain embodiments, the access point 215 operates on a single Wi-Fi channel at a fixed bandwidth. The Wi-Fi channel number and bandwidth form a unique combination, as is known in the art. For example, if the access point 215 operates in channel number 155, then clients connected to the access point 215 will exchange data exclusively via channel 155.

At any location, it is possible that there are multiple wireless access points operating in the same or different Wi-Fi channels. Access points that operate on different channel numbers will not interfere with each other, while access points that operate on the same channel will interfere with each other and result in a reduction of bandwidth/throughput. If two or more access points are operating via the same channel number, then those access points share the available Wi-Fi medium in a "half-duplex" manner. For example, two access points operate via channel 155, then at any point either of the access points can send data, but not simultaneously.

The Received Signal Strength Indicator (RSSI) is an indicator of the signal strength of a wireless link supported by an access point. The higher the RSSI, the better the signal strength and better the throughput. The lower the RSSI, the lower the signal strength and lower the throughput. An RSSI value may be lower, for example, because of a greater distance between the client device and the access point, because of the presence of physical obstructions between the client device and the access point, or because of the presence of a crowd of people around the access point hardware. Signal-to-Noise ratio ("SNR") is another indicator of signal quality, or interference. The higher the SNR, the better the quality and better the throughput.

In accordance with various embodiments, the video production device 110 (or another component in the system 100) determines the operating health of the wireless network established by the access point 215. The operating health can be determined based on RSSI measurements, SNR measurements, wireless network speed of the wireless links between the video capture devices 160 and the video production device 110 (specifically, MCS rate for 802.11n or 802.11ac Wi-Fi), data throughput metrics, bandwidth measurements, size of buffered data at the video production device 110 or at the camera, percentage of the Wi-Fi channel free (transmit opportunity, TXOP), or the like. The information, measurements, and data related to the operating health of the wireless network can be utilized (in the manner described in more detail below) to prioritize, optimize, and otherwise adjust operating parameters of the system. For example, the video production device 110 can manage the adjustment of certain characteristics of the video streams generated by the video capture devices and/or the characteristics of the wireless links that are used to transmit the video streams.

Figure 2:
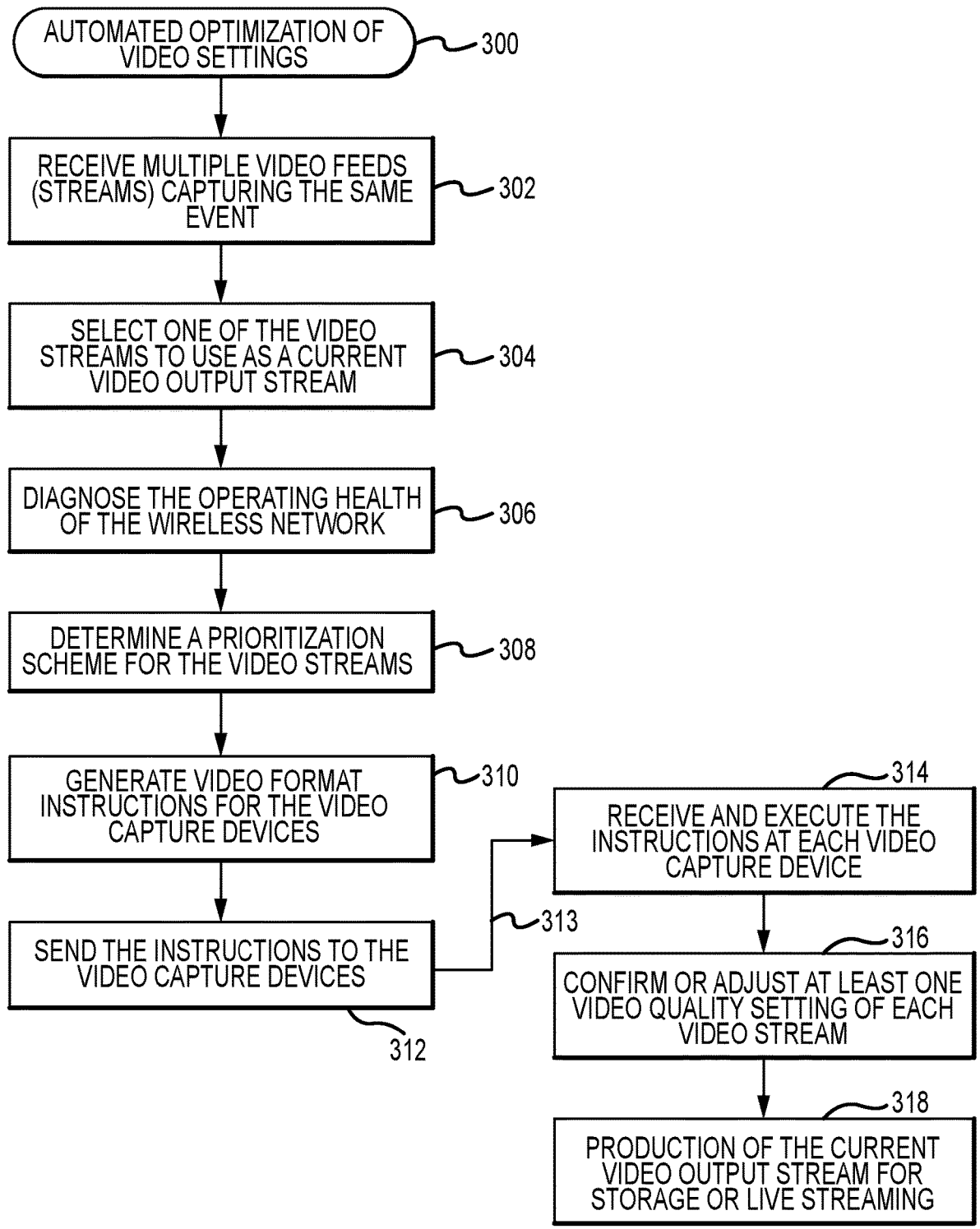
FIG. 2 is a flow chart that illustrates an exemplary embodiment of a method for operating a video production system.

FIG. 2 is a flow chart that illustrates an exemplary embodiment of a method for operating a video production system. More specifically, FIG. 2 illustrates a process 300 for automated optimization of video settings of a plurality of video capture devices that are operating within a common wireless network. The various tasks performed in connection with the process 300 may be performed by software, hardware, firmware, or any combination thereof. For illustrative purposes, the following description of the process 300 may refer to elements mentioned above in connection with FIG. 1. In practice, portions of the process 300 may be performed by different elements of the described system, e.g., the video production device 110, the control device 130, one or more of the video capture devices 160, or the like. It should be appreciated that the process 300 may include any number of additional or alternative tasks, the tasks shown in FIG. 2 need not be performed in the illustrated order, and the process 300 may be incorporated into a more comprehensive procedure or process having additional functionality not described in detail herein. Moreover, one or more of the tasks shown in FIG. 2 could be omitted from an embodiment of the process 300 as long as the intended overall functionality remains intact.

The following description of the process 300 assumes that multiple video capture devices (cameras) are capturing video of the same event. Accordingly, the process receives multiple video feeds (e.g., video streams from the video capture devices) capturing the same event (task 302). For the exemplary embodiment described here, the video streams are received at the video production device 110 for encoding, processing, and handling as needed. The process 300 continues by selecting one of the plurality of video input streams as a current video output stream (task 304). In certain embodiments, task 304 is performed by the video production device 110, automatically based on certain selection criteria or in response to a command or an instruction from an operator, producer, or other user. The selected video feed can be provided as a live or substantially live video stream to any number of end users, or it can be recorded/stored for subsequent processing or editing. In this regard, the selected video feed data can be stored at the video production device 110, at the control device 130, at the hosting or distribution server system 250, at the source video capture devices 160, and/or elsewhere in the system if so desired. The selected video feed can be provided or otherwise used as the current video output stream for a designated time interval or until another video feed has been selected.

As mentioned above, the video production device 110 and the different video capture devices 160 are arranged and configured as client devices within a wireless network supported by the wireless access point 215 of the video production device 110. The process 300 may continue by diagnosing the operating health of the wireless network (task 306) using any or all of the techniques and methodologies described above. In certain embodiments, the diagnosing is performed by the video production device 110 and/or the control device 130 in an ongoing manner to obtain information, statistics, and data related to the wireless links between the video capture devices 160 and the video production device 110. Additionally or alternatively, the diagnosing can be performed to obtain information, statistics, characteristics, and metadata related to the video streams that are being transmitted using the wireless links. Thus, the diagnosing step can analyze various characteristics of the wireless links between the video production device 110 and the plurality of different video capture devices 160. The information obtained at task 306 reflects the current operating health and status of the wireless network, which may dynamically change over time.

The exemplary embodiment of the process 300 continues by determining a suitable prioritization scheme for the video input streams and/or for the video capture devices (task 308). In practice, task 308 is performed in response to the selection made at task 304, and further in response to the diagnostic data obtained at task 306. In this regard, the selected video stream is prioritized because it serves as the current output stream that is to be edited, produced, stored, published, or live streamed. Consequently, the remaining unselected video streams are designated to be of lower priority relative to the selected video stream. In certain embodiments, the unselected video streams are similarly or identically ranked together as a group, with only the selected video stream prioritized (i.e., ranked substantially higher). In alternative embodiments, the unselected video streams can be ranked or prioritized individually, based on any desired priority scheme or methodology. For example, the diagnostic information obtained for each individual wireless link can be utilized to prioritize the different unselected video streams relative to one another. In this regard, the prioritization scheme can be determined based on the operating health of the individual connections in the wireless network.

The prioritization scheme determined at task 308 can be used to generate appropriate video format instructions for each of the different video capture devices (task 310). Depending upon the particular system deployment and implementation, task 310 may be performed by the video production device 110 and/or by the control device 130. The video format instructions are sent from the video production device 110 to the video capture devices 160 (task 312), via the wireless network and/or wired connections. The arrow 313 in FIG. 2 represents the transmission of the video format instructions from the video production device 110 to the video capture devices 160. This description assumes that the video format instructions are successfully transferred to the video capture devices 160.

The individual video format instructions are received and executed at each video capture device (task 314). The video format instructions are configurable to be executed by the video capture devices to confirm or adjust at least one video quality setting of the video input streams provided by the video capture devices (task 316). Due to the prioritization scheme, which influences the manner in which the video format instructions are created, the currently selected video output stream is controlled to be of higher quality relative to the unselected video input streams. In certain embodiments, the video format instructions are executed by the video capture devices to confirm or adjust the bitrate settings of the video input streams. In this regard, the video capture device that is providing the current video output stream can be instructed to set a higher bitrate for the current video output stream, relative to the bitrates used for the unselected video streams. In some embodiments, the video format instructions are executed by the video capture devices to confirm or adjust the bitrate video resolution settings of the video input streams. In this regard, the video capture device that is providing the current video output stream can be instructed to set a higher video resolution for the current video output stream, relative to the resolutions used for the unselected video streams. In practice, the bitrate setting and/or the video resolution setting can be controlled, adjusted, set, or confirmed for each of the video capture devices. Consequently, the currently selected video stream can be prioritized such that it has a relatively high bitrate and a relatively high resolution. In contrast, the quality of the unselected video streams need not match the quality of the selected video stream because the unselected video streams are not utilized for production, editing, or live streaming. Nonetheless, high quality versions of the unselected video streams can be locally saved at the originating video capture devices and later retrieved if so desired.

The selected video feed can be produced or provided as a live or substantially live video stream to any number of end users, or it can be recorded/stored for subsequent processing or editing (task 318). In this regard, the selected video feed data can be stored at the video production device 110, at the control device 130, at the hosting or distribution server system 250, at the source video capture devices 160, and/or elsewhere in the system if so desired.

At least a portion of the process 300 can be repeated in an ongoing manner to monitor the changing status of the wireless network and, in response to changes that are deemed significant, update the prioritization scheme and provide updated video format instructions for the video capture devices as needed. Moreover, a portion of the process 300 is repeated whenever a different video capture device is selected (at task 304). This ensures that the currently selected video capture device and its output video stream will be prioritized in a dynamic and responsive manner.

Although the example described above prioritizes the selected video capture device and its video stream, it may not be possible or desirable to do so at all times. For example, depending on the particular system implementation, the specifications of the video capture devices, the current operating health status of the wireless network, and other factors, it may be prudent to lower the bitrate and/or video resolution associated with the selected video capture device. This may be desirable if the selected video capture device is located far away from the video production device or if its measured RSSI is relatively low. In accordance with another exemplary scenario, it may not be necessary to prioritize or adjust settings for the selected video capture device if the operating health of the wireless network is good and plenty of network bandwidth is available for use by all of the wireless connections. Indeed, the prioritization scheme mentioned above need can remain disabled or inactive until the diagnostic health check determines that it would be beneficial to enable the scheme.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An automated process, comprising:
receiving a plurality of video feeds from a plurality of video-capture devices, the video feeds each having a quality parameter set to an initial value;
selecting a priority feed from the video feeds;
generating format instructions for the plurality of video capture devices to implement a prioritization scheme, wherein the prioritization scheme includes a bitrate and a resolution for each of the plurality of video feeds, wherein the format instructions include setting a quality parameter of the priority feed to a priority value in response to selecting the priority feed; and
instructing the video-capture devices to format the video feeds according to the format instructions by setting the quality parameter of each video feed.

2. The automated process of claim 1, wherein the quality parameter for each video feed comprises a bitrate or a resolution for the video feed.

3. The automated process of claim 1, further comprising streaming the priority feed as a video output.

4. The automated process of claim 1, further comprising displaying the video feeds for selection in an interface.

5. The automated process of claim 4, wherein the interface comprises a map including a location of the video-capture devices.

6. The automated process of claim 1, wherein the priority value comprises a first bitrate higher than a second bitrate of the initial value.

7. The automated process of claim 1, wherein the priority value comprises a first resolution higher than a second resolution of the initial value.

8. The automated process of claim 1, further comprising:
   diagnosing an operating health of a wireless network including the video-capture devices; and
   generating the prioritization scheme for the video feeds based on the operating health of the wireless network.

9. A video system comprising a processor in communication with non-transitory memory configured to store instructions that, when executed by the processor, cause the video system to perform operations, the operations comprising:
   receiving a plurality of video feeds from a plurality of video-capture devices, the video feeds each having a quality parameter set to an initial value;
   selecting a priority feed from the video feeds;
   generating format instructions for the plurality of video capture devices to implement a prioritization scheme,
      wherein the format instructions include setting a quality parameter of the priority feed to a priority value in response to selecting the priority feed; and
   instructing the video-capture devices to format the video feeds according to the format instructions by setting the quality parameter of each video feed.

10. The video system of claim 9, wherein the quality parameter for each video feed comprises a bitrate or a resolution for the video feed.

11. The video system of claim 9, wherein the operations further comprise streaming the selected priority feed as a video output.

12. The video system of claim 9, wherein the operations further comprise displaying the video feeds for selection in an interface.

13. The video system of claim 12, wherein the interface comprises a map including a location of the video-capture devices.

14. The video system of claim 9, wherein the priority value comprises a first bitrate higher than a second bitrate of the initial value.

15. The video system of claim 9, wherein the priority value comprises a first resolution higher than a second resolution of the initial value.

16. The video system of claim 9, wherein the operations further comprise:
   diagnosing an operating health of a wireless network including the video-capture devices; and
   generating the prioritization scheme for the video feeds based on the operating health of the wireless network.

17. A non-transitory computer readable medium including instructions stored thereon that, when executed by a processor, cause the processor to perform operations, the operations comprising:
   receiving a plurality of video feeds from a plurality of video-capture devices, the video feeds each having a quality parameter set to an initial value;
   selecting a priority feed from the video feeds;
   generating format instructions for each of the plurality of video capture devices to implement a prioritization scheme,
      wherein the format instructions include setting a quality parameter of the priority feed to a priority value in response to selecting the priority feed; and
   instructing the video-capture devices to format the video feeds according to the format instructions by setting the quality parameter of each video feed.

18. The computer readable medium of claim 17, wherein the priority value comprises a first bitrate higher than a second bitrate of the initial value.

19. The computer readable medium of claim 17, wherein the priority value comprises a first resolution higher than a second resolution of the initial value.

20. The computer readable medium of claim 17, wherein the operations further comprise:
   diagnosing an operating health of a wireless network including the video-capture devices; and
   generating the prioritization scheme for the video feeds based on the operating health of the wireless network.

* * * * *